United States Patent [19]

McSwain

[11] Patent Number: 4,889,330

[45] Date of Patent: Dec. 26, 1989

[54] TROWEL VISE

[76] Inventor: Gregory D. McSwain, 3341 California Rd., Okeana, Ohio 45053

[21] Appl. No.: 147,550

[22] Filed: Jan. 25, 1988

[51] Int. Cl.⁴ ................ B23Q 3/00

[52] U.S. Cl. ................ 269/95; 269/219

[58] Field of Search ................ 269/104, 118, 120, 121, 269/111, 219, 221, 218, 3, 95

[56] References Cited

U.S. PATENT DOCUMENTS

| | | | |
|---|---|---|---|
| 2,761,475 | 9/1956 | LaHayne | 269/120 |
| 3,358,990 | 12/1967 | Anton | 269/118 |
| 3,423,082 | 1/1969 | Reyner | 269/104 |
| 3,490,759 | 1/1970 | Troutner | 269/118 |
| 4,405,002 | 9/1983 | Catalano | 269/221 |

FOREIGN PATENT DOCUMENTS

| | | | |
|---|---|---|---|
| 342869 | 2/1931 | United Kingdom | 269/219 |
| 603460 | 6/1948 | United Kingdom | 269/221 |

*Primary Examiner*—Robert C. Watson

[57] ABSTRACT

A pair of bars form a vise, and are clamped together against a tool blade to be notched by a file. One clamp screw passing through the bars acts as a constant reference for one side of a tool blade, while a second clamp screw is repositioned in a clearance holes to accommodate various widths of blades. A top edge of the vise is used as a reference for blade extension, and a bottom edge is used to support the assembly on a bench top while in use.

4 Claims, 1 Drawing Sheet

"D"

TROWEL VISE

BACKGROUND OF THE INVENTION

This invention relates to notched-edge tools, such as those used to spread mastic for floor tiles and carpet.

Notched-edge trowels and knives are used to spread mastic on concrete floors and the like, rapidly creating swirls of mastic beads, having a constant height. The teeth of a trowel wear down in time, and it is desirable to re-notch the tool, to extend its life.

Commercial notchers exist, which act like pliers or hand shears, and have a cutting edge to form the notches in the edge of sheet metal. Some trowel blades are plain cargon steel, while some are tempered steel. The tempered steel blades can cause notchers to break, requiring cutter replacement.

A more consistent re-notching job can be done with a properly used file, if the tool blade is properly held.

It is, therefore, an object of the present invention to provide a vise for holding a variety of trowel blades and the like, while re-shaping the blade notches.

SUMMARY OF THE INVENTION

The invention is shown embodied in a trowel vise having opposed bar-like jaws which may be clamped against a tool blade sandwiched therebetween. A first fastener acts in a constant position to locate one side edge of a tool blade, while a second fastener is repositionable along the jaws to accomodate various tool blade widths. A top longitudinal edge of one jaw serves as a reference for proper extension of the blade to be notched.

DESCRIPTION OF THE PREFERRED EMBODIMENT

Figures 1, 2, 3, 4, 5:
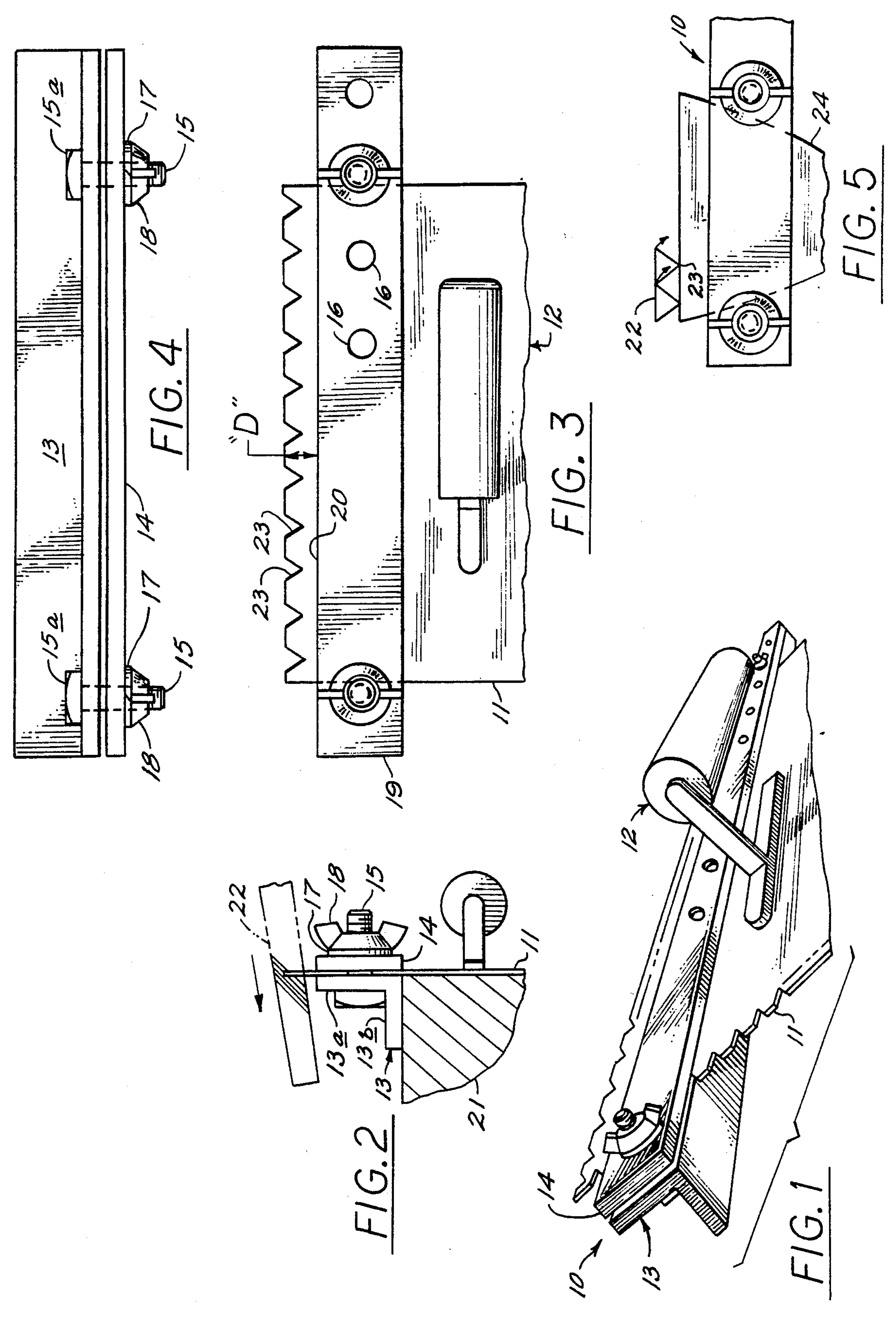
FIG. 1 is a perspective view of trowel vise for holding a tool blade for re-notching.
FIG. 2 is a side elevational view of the trowel vise of FIG. 1.
FIG. 3 is a front elevational view of the trowel vise of FIG. 1.
FIG. 4 is a top plan view of the trowel vise of FIG. 1.
FIG. 5 is a front elevational view of a flat-edged tool blade being notched.

Referring to the drawings, FIG. 1 shows a trowel vise 10 for re-shaping a tool blade 11, for example, that of the trowel 12 depicted as clamped between the two opposed vise jaws 13, 14.

FIG. 2 illustrates that one jaw 13 is formed from an L-shaped angle bar, having equal-length legs 13*a*, 13*b*. The other jaw 14 is clamped with the first jaw 13, and is formed of flat bar stock, equal in height to the angled jaw 13. Both jaws 13, 14 are, preferably, plated steel.

A pair of screws 15 pass through clearance holes 16 in the jaws 13, 14, and mating washers 17 and wing nuts 18 serve to clamp the vise 10 with a tool blade 11. The screws 15 have a square head 15*a* which fits close enough to the bottom leg 13*b* of the first jaw to prevent rotation of the screws 15.

In FIG. 3 and 4, it is seen that a plurality of clearance holes 16 are provided along the jaws 13, 14, with the first screw 15 positioned constantly near one end 19 as a side reference guide for a tool blade 11, while the other screw 15 may be repositioned to accomodate various width tool blades 11 which pass between the screws 15. It is preferred that the screws 15 be placed close to the sides of a tool blade 11 to securely clamp and prevent chatter when cutting on the tool blade 11.

PROCEDURE FOR RE-NOTCHING TOOL BLADES

With the top edge 20 of the vise 10 as a guide, the tool blade 11 is extended through, to a desired dimension "D", and clamped.

Once the blade 11 is clamped in position, it can be hand-held or placed firmly on any bench, counter top, or tool box 21 (see FIG. 2). A three-corner file 22, round file, or rod saw is then used to generate the desired notches 23.

PROCEDURE FOR NOTCHING FLAT-EDGE BLADES

With reference to FIG. 5:

1. Make a slight cut with a three-corner file 22, ⅛ inch (approx. 3 mm) from the trowel end.
2. With the file resting in the new notch, roll the file over to the next point 23 for the second notch.
3. Continue this process the entire length of the trowel 24.
4. Divide the distance between the first and second notches in halves, or thirds, depending on the spacing desired. Make a new cut and repeat step 2.
5. For best results, make all initial cuts before filing to the final, desired depth.

While a preferred embodiment has been illustrated and described, the invention is not so limited, and other embodiments and modifications, readily apparent to those skilled in the art, are intended to be covered by the claims.

For example, the angle bar 13 could be replaced by a flat bar, although the vise 10 would be less stable on a bench and other means would be needed to keep the screws 15 from turning. A wrench or the use of carriage bolts in slots would suffice.

Replacement of the square-headed screws 15 with thumb screws threaded into one of the jaws 13, 14 would be another embodiment.

What is claimed is:

1. A vise for use in re-shaping a tool blade, comprising:

(a) an angle bar, having an L-shaped cross-section, said bar having a plurality of spaced-apart holes through one leg of said L-shaped cross-section;

(b) a flat bar of approximately equal length with said angle bar, and having a like plurality of spaced-apart holes;

(c) a reference edge along one of said bars; and (d) a pair of clamping fasteners, the first fastener maintained at a constant location, passing through said bars, and the second fastener being adjustably positionable along said bars relative to said first fastener, so that said fasteners are proximal to opposite sides of a tool blade sandwiched between said bars.

2. A vise for use in shaping a tool blade, comprising:

a first elongate substantially rigid vise member;

a second elongate substantialaly rigid vise member;

a reference edge along one of said first and second vise members;

first means for clamping said first and second vise members together, and for providing a reference for a first side of said tool blade; and second means for clamping first and second vise members together against a tool blade sandwiched therebetween, said second means located proximal a second side of said tool blade, opposite said first side, and wherein said second means for clamping is re-positionable along the length of said first and second vise members with respect to said first means.

3. The vise of claim 2, wherein said second means comprises fastener means.

4. The vise of claim 2, further including a support surface along at least one of said first and second vise members.

* * * * *